May 6, 1969
L. WALTON ET AL
3,442,110
METHOD AND APPARATUS FOR MAKING HOLES WITH
COLD-WORKED MARGINS AND THE PRODUCT
Filed Aug. 12, 1965
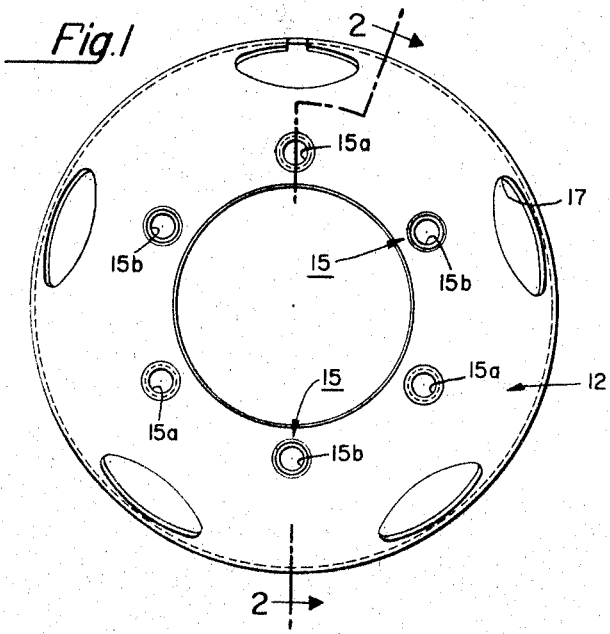
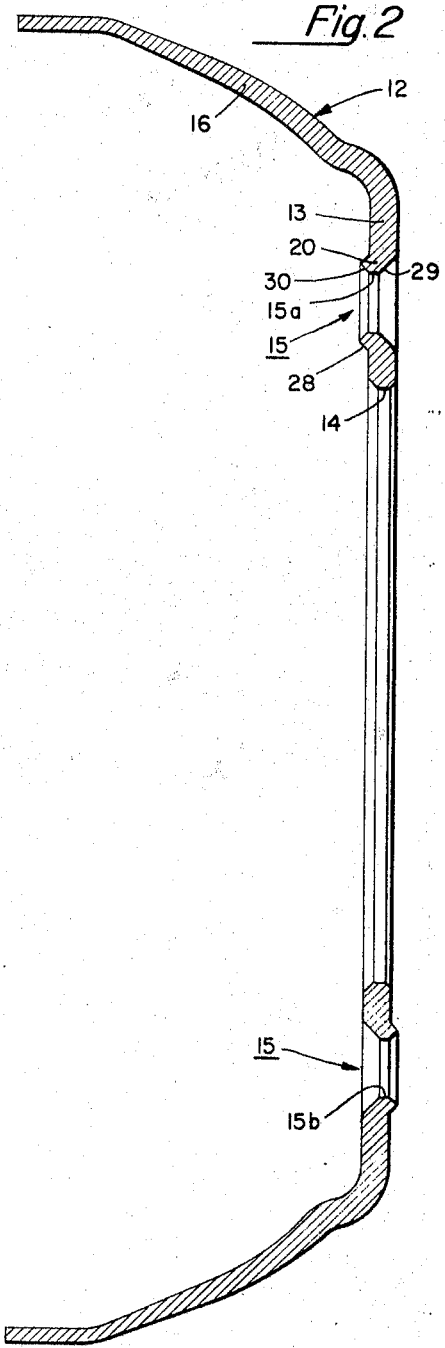
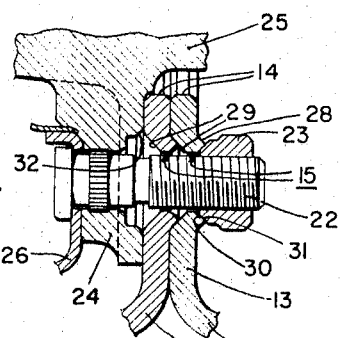
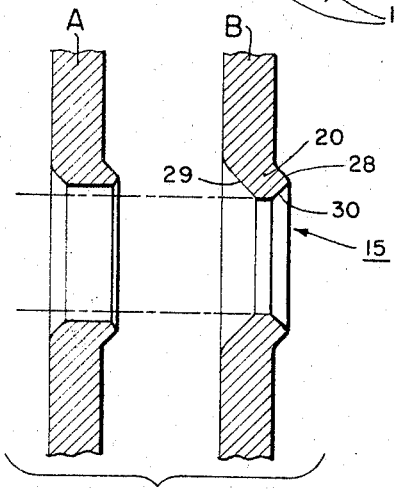
INVENTORS
LEONARD WALTON
PATRICK J. HOGAN
John B. Sowell
ATTORNEY

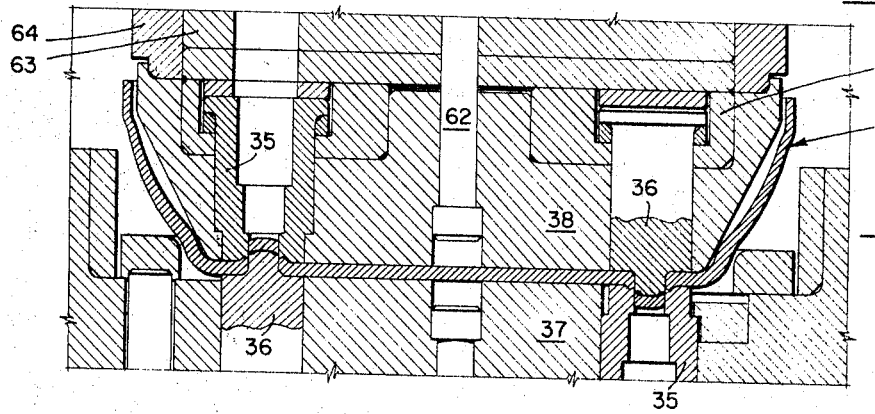
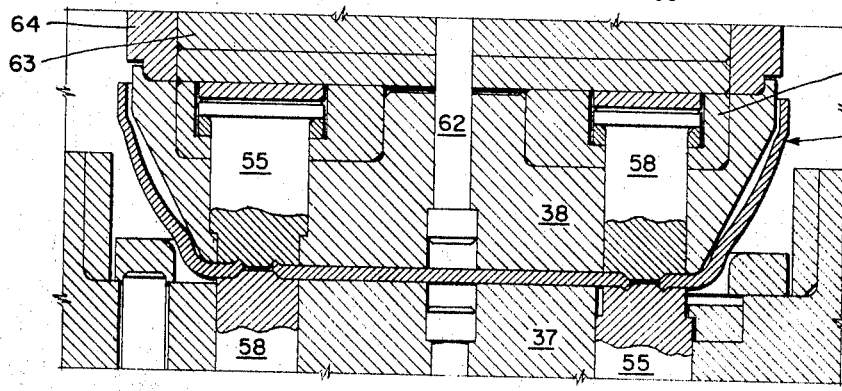
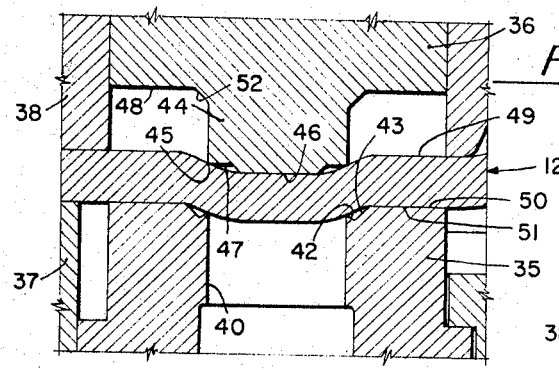
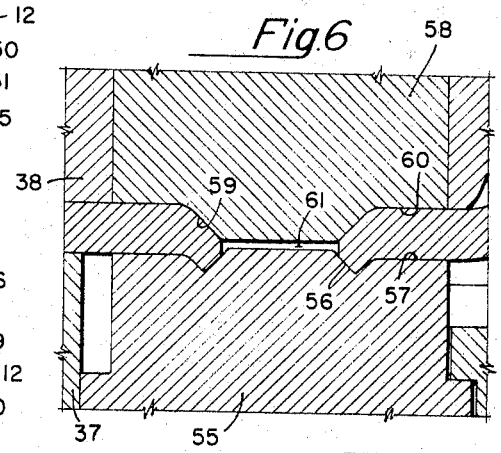
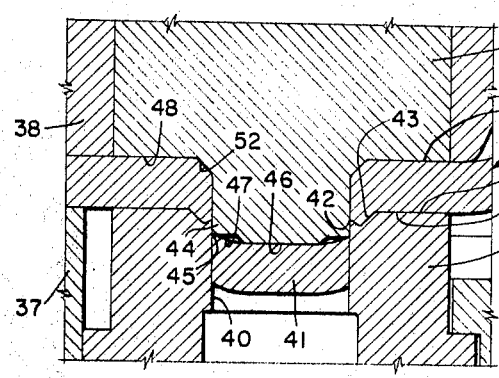

United States Patent Office 3,442,110
Patented May 6, 1969

3,442,110
METHOD AND APPARATUS FOR MAKING HOLES WITH COLD-WORKED MARGINS AND THE PRODUCT
Leonard Walton, Grosse Point, and Patrick J. Hogan, Mount Clemens, Mich., assignors to The Budd Company, Philadelphia, Pa., a corporation of Pennsylvania
Filed Aug. 12, 1965, Ser. No. 479,259
Int. Cl. B21d 31/02, 22/00, 31/00
U.S. Cl. 72—327                              17 Claims

ABSTRACT OF THE DISCLOSURE

An apparatus and method for making a hole with a cold-worked hardened margin in which a workpiece is placed between mating dies, a hole in pierced therethrough and the adjacent metal stretched in the initial movement of the dies toward each other. Further movement of the dies coins and preshapes the metal about the hole. The metal blank is then transferred to a second set of dies wherein the margin of the hole is further cold-worked and coined to the final accurate shape.

---

This invention relates to method and apparatus for making holes with cold-worked margins and the product, particularly as related to stud bolt attachment holes for automotive disk wheels, and has for an object the provision of improvements in this art.

The present invention is related to and, in some respects, an improvement upon the invention disclosed in the patent of Walton and Hogan 3,131,972, May 5, 1964; and, in some respects, provides improvements in the nesting hole flange type of disk securement structures disclosed in the patents of Eksergian 2,195,589 and 2,597,835.

The present invention, like that of our prior patent, is particularly concerned with the securement of dual wheel disks having flat mating surfaces in the inner attachment zone where the disks are secured by stud bolts to the wheel hub flange, along with a drum head in most cases. Nesting flanges, bosses, or lips at the stud bolt holes in the disks assist in preventing shifting movement of the disks; and, for reasons fully explained in the Eksergian patents, the hole flanges or bosses of alternate holes project out from opposite sides of the disk.

Disk wheels of the dual-tire type are made with axially offset or dished portions to provide space for rims and tires while permitting the inner attachment portions to be secured together and to the hub flange and brake drum head. The dished shape has the added advantage of providing resilience, the disks being made of springy metal such as steel. The wheel disks are detachably secured to the hub flange by suitable fastening means, such as lug bolts or studs with nuts, so that the wheel disks, either with or without tires thereon, may be readily secured to or removed from the wheel hub disk.

These wheel disks have a large center hub hole which receives the hub body, a concentric group of lug bolt holes, and an outer concentric group of lightening or hand holes which reduce the weight of the disk and also increase its flexibility in the axially bent or offset zone.

The present invention is concerned with the formation of the lug bolt holes in the inner flat portion of the disk where the load stresses are greatest. When the nuts of the bolts are tightened on the disks, points of high load stress concentration are created at one or all of the hole margins and these stresses are accentuated by the driving, braking and axial thrusts on the wheels in use. These stresses tend to cause fatigue cracks to start at the holes and increase in length until failure occurs.

It is usual to form disks for wheels by rolling the metal and this produces elongated grain structure in the plane of the disk. That is to say, the disk, in a sense, has axial laminations; and when holes are formed in the disk it is desirable to avoid cutting through the laminations except at the edge of the hole. The present invention, like that of the patent mentioned above, accomplishes this and where the thickness has to be reduced around the margin of the hole it is drawn or attenuated with a reduction of laminae thickness without cutting through the outer surfaces. It was explained in the patent how this constituted an improvement over the former method of machine-cutting the surfaces in forming the margins around the holes. These advantages of the improved method of formation need not be repeated here.

For a better understanding of operations, our patent defined certain pertinent accepted terminology used in the art and for convenience these definitions will be repeated here. "Forming," in the usual sense in the art, implies a change in the shape of a workpiece other than a simple reduction in thickness. "Drawing" is a plastic flow in which the metal is shaped under tension. "Coining" is a compressing action in closed dies in which metal flow is restricted. "Restriking" is a compressive action in which stresses are induced in the metal. "Cold-working" is a plastic flow of unheated metal under applied external forces and with metals like steel, here dealt with, results in a hardening of the metal. "Extrusion" is a plastic flow of metal through a die, usually caused by compression in whole or part.

The general object of the invention is to provide cold-worked margins for holes to increase the strength and inhibit the formation of cracks.

Another object is to produce bolt hole margins having superior yield strength characteristics.

Another object is to provide method and apparatus which combine a number of actions in a single operation whereby to reduce the number of operations and the number of tools required for accomplishing the desired result.

Another object is to provide method and means for cold-forming and coining hole margins without raising the metal outside the margin.

Another object is to provide holes with cold-worked margins which are finished accurately to final shape in the die operations, avoiding all machine finishing and increasing wear life.

Another object is to form holes with side-protruding nestable margins and interior conical seating surfaces.

Another object is to provide method and apparatus for forming the holes and margins of all of a group of holes simultaneously; and more specifically, with marginal flanges, bosses, or lips, protruding in both directions from the medial plane of the disk.

The objects are attained in large measure by drawing the metal in forming a hole to reduce the marginal thickness while preserving the laminae in uncut condition except at the hole edges and at the same time imparting a cold-working action; punching out a slug to form the hole; and coining the margin to final shape. The present invention provides a double coining action instead of a single coining action; combines the pre-drawing and first coining actions with the slug-punching action; and coins an inner marginal surface as well as an outer marginal surface.

The above-mentioned and other objects of the invention, as well as various novel features and advantages, will be apparent from the following description of certain exemplary embodiments, reference being made to the accompanying drawings, in which:

FIG. 1 is an elevational view of a cupped wheel disk having lug bolt holes formed in accordance with the present invention;

FIG. 2 is a greatly enlarged section taken on the line 2—2 of FIG. 1;

FIG. 3 is a fragmentary section showing two wheel disks and a brake drum head secured to a wheel hub flange by a lug bolt and nut;

FIG. 4 is an enlarged section through a first set of dies at the start of the formation of a hole with a protruding nesting marginal flange or boss;

FIG. 5 is a section like FIG. 4 but showing the position of parts at the completion of the action of the first set of dies;

FIG. 6 is a section through a second set of dies which coin and finish the hole marginal surfaces to final accurate shape;

FIG. 7 is a comparison view showing the shape of parts at a hole as formed in FIG. 5 and FIG. 6, respectively;

FIG. 8 is a section through a die press assembly showing slugs punched out in opposite directions by two sets of dies like those shown in FIGS. 4 and 5;

FIG. 9 is a section like FIG. 8 but showing coining dies like those of FIG. 6.

FIGS. 1 and 2 show a cupped wheel disk 12 having a flat attachment portion 13 with a central hub hole 14 and an annular concentric group of lug bolt holes for attachment purposes. These holes are designated in general by the numeral 15 and in particular by oppositely extending groups as 15a and 15b. The outer curved or dished portion 16 is provided with lightening or hand holes 17. In our patent the hub hole 14 was shown to be formed by the same die sets which formed the lug bolt holes; the present invention deals only with the formation of the lug bolt holes, leaving the hub hole to be formed either before or after, although it could be formed along with the lug bolt holes.

The lug bolt holes have projecting marginal flanges or bosses 20 for nesting and securement purposes; and alternate holes 15a have marginal bosses projecting from one side of the plane of the disk (inside the dish of the disk) while the other alternate holes 15b have marginal bosses projecting from the other side of the plane of the disk (outside the dish of the disk).

FIG. 3 shows how two disks 12 are secured by a lug bolt 22 and its nut 23 to the flange 24 of a wheel hub 25, a brake drum head 26 being secured to the hub flange by the same bolts used to secure the wheel disks. This view shows how the flat radial portions 13 of the disks engage each other and the flat face of the hub disk in faying or interengaging faces, how the outer conical face 28 of the projecting boss 20 of one disk nests in a conical depression seat 29 of the other disk, and how a second conical depression surface 30 is engaged by a conical surface 31 of the nut 23.

At alterante bolts the projecting bosses will be directed in the opposite direction so that the boss of the inner disk will have its surface 28 nested in a conical seat 32 in the hub flange and the conical surface 31 of the nut will engage in the conical surface 29 of the hole of the outer disk. As stated, this nesting and alternating projection arrangement and its uses and advantages are fully explained in the designated Eksergian patents and need not be elaborated here. It need only be noted that it is very desirable to have hardened closely-dimensioned smooth hole margins, these margins including the conical surfaces 28, 29 and 30 and a certain annular width of the flat surfaces on either side of the disk around the hole and boss. The present invention deals with the formation of the holes and the critical marginal areas around the holes.

Referring to FIGS. 4 and 5, a first set of dies, comprising a female die or button 35 and a male die or punch 36, perform a three-stage action on the wheel disk, workpiece or blank 12 while it is firmly held between blank holders 37 and 38, the blank holders providing guides for the die members 35 and 36.

The female die member 35 is provided with a hole 40 for receiving a slug 41 which is cut out of the blank, a cutting edge 42, and an annular groove 43 in which the projecting boss is formed. Since the boss is to project from one side of the disk, the cutting edge 42 at the inner edge of the groove is disposed at a lower level than the outer edge of the groove.

The male die member 36 is provided with a punch projection 44 having a cutting edge 45 and beyond this a central blunt-ended projection 46 of smaller diameter with a shoulder or ledge 47 therearound.

In the first die operation, the small-diameter blunt-ended projection 46 begins the hole formation by creating a depression in the disk and drawing the metal on the sides to cold-work it without cutting the surfaces as the punch begins to enter the aperture of the female die member.

Following the initial cold-drawing action, the cutting edge 45 of the punch cuts a slug 41 from the disk and forces it into the outwardly tapered hole 40 of the female die member.

Finally, as shown in FIG. 5, a flat coining surface 48 of the male die 36 strikes the upper surface of the disk in an annular area 49 outside the boss and conical depression and coins it against a mating flat coining surface 50 of the female die 35 on an area 51 of the disk on that side. An inclined conical portion 52 of the punch forms the conical depression 29 and forces down material to form the boss 20 around the hole while the groove 43 of the female die member initially forms the boss with its inner or terminal conical cavity 30 and its outer conical surface 28. Since the metal is confined and compressed, this constitutes a first coining action on all marginal portions around the hole. And since the metal is all confined there can be no outflow of metal to form a projection around the marginal zone.

In the next operation, as shown in FIG. 6, a second set of dies coins and shapes the marginal area to final accurate dimensions. The second die set includes an anvil die member 55 formed with a boss-shaping annular groove 56 and an outer flat coining surface portion 57, and a striking die member 58 formed with a conical portion 59 and an outer flat coining surface portion 60. The dies are so dimensioned and actuated that there is a celarance space 61 left between their inner flat-ended portions to take any flash metal which may be created in the very accurate dimensioning of the marginal portions around the hole. The blank-holders 37, 38 are the same or like those used in the first operation.

FIG. 8 shows the blank holders 37, 38 provided with a plurality of first die sets (as in FIGS. 4 and 5), two sets actually being shown, with one set arranged to form downwardly extending bosses and the other set arranged to form upwardly extending bosses. The die members themselves are the same as hereinbefore described and are designated by the same reference characters, so no detailed description is needed.

The holder and striker parts of the die assemblies are held together by bolts 62 and the relativley movable parts 63 are suitably held in position by guides 64 (upper only being shown). Stop elements 65 prevent overtravel of the moving elements against the die members.

The slugs of alternate holes are driven upward, as shown at the left of FIG. 8, but since they cannot return into the die holes and since they cannot wedge together in the expanding spaces provided in the assembly, they will cause no trouble and will be expelled from the top of the space after they fill the space.

FIG. 9 shows a multi-die assembly for the second die set, the arrangement and action being obvious without detailed description.

In FIG. 7 the shapes formed by the first and second die operations are shown in adjacent relationship for purposes of comparison. The form designated as A is that produced by the first set of dies, as shown in FIG. 5; and the form designated as B is that produced by the second set of dies, as shown in FIG. 6. It will be noted that the interior diameter of the hole is reduced and the width of its cylindrical (I.D.) portion is shortened in the second die-forming action; and that the concave conical surfaces 29 and 30 are broadened. All portions around the hole are restruck and further hardened.

It will be noted that flat conical surfaces are shown herein, whereas spherical surfaces are shown in our patent, this following the preferred practice of providing flat conical surfaces when projecting bosses are formed and providing spherical surfaces when there are no projecting bosses around the holes.

A special advantage derived from the use of the first set of dies disclosed herein is that the opening of the blank holder for the male die member is very considerably greater than the extrusion aperture in the lower die member, which provides a relatively very wide annular area for metal flow by drawing when the blunt-ended small extension portion of the male die member acts on the blank, hence there is no extreme drawing action in a limited zone.

The cutting edges for forming a slug come into action while the metal is being drawn by the center projection 46 of the male die member and the drawing action continues until the slug is fully cut out. This draws the upper laminae of the disk down into the conical recess 29 without cutting into it. By varying the length of the projections 46 the action can be varied and the metal thickness left for final die shaping and coining action very accurately controlled.

When the flat coining portions of the die members strike the stretched zone they smooth out, flatten, and initially coin all marginal areas, whereby to present the partly formed blank in better condition for action by the second set of dies.

From the above description it will be seen that the marginal bosses and hardened coined marginal surfaces are formed by the present method and apparatus; that alternating oppositely extending bosses are formed simultaneously; that in the die operation there is a combined drawing, hole-punching, and coining action; that there are successive coining actions; that the second coining and final-shaping action is more expeditious and accurate because of the pre-forming and pre-coining action; that all of the added strength and freedom from incipient cracking of our prior patented invention are retained under the present invention; and that a superior flanged-hole type of disk structure is provided.

While certain embodiments of the invention have been disclosed for purposes of illustration, it is to be understood that there may be various embodiments and modifications within the general scope of the invention.

We claim:

1. The method of making a hole with a cold-worked hardened margin therearound, as for a steel wheel disk blank, which comprises, holding a cold plate blank of work-hardenable metal in opposed blank holders which engage the blank around a diameter which is larger than the hole and the marginal area to be formed therearound, positioning a female button die, having a hole and a slug cutting edge therearound, on a first side of said blank within the diameter held by the blank holders, positioning, on a second side of the blank, a male punch die, having a blunt-ended pilot projection smaller than the hole in the female die, a ledge and a cutting edge on the main punch projection behind the pilot projection, and a flat coining face opposed to a flat coining face of the female die, forcing the male die into the female die to first stretch metal of the blank within the blank holder diameter by the pilot projection, cutting out a slug while continuing to stretch the metal by the pilot projection, and coining the margin around the hole by the opposed flat coining faces in the final converging movement of the dies.

2. The method as set forth in claim 1, which further comprises, transferring the punched and pre-coined blank to a second or coining set of dies with accurately shaped coining surfaces, and striking the hole marginal zone surfaces while cold with the second set of dies to further cold-work the margin and bring it to final accurate shape.

3. The method as set forth in claim 1, which further comprises, punching the blank by a male die which has a tapered shoulder around the base of the main punch projection, and receiving the inner margin of the blank around the hole in an annular groove in the female die to form an annular boss around the hole extending from the first side of the blank toward the female die side.

4. The method as set forth in claim 3, which further comprises, striking the margin having the projecting boss with a second or coining die set which fits all surfaces of the boss, except the inner cylindrical surface left by the slug removal, and also engages the marginal pre-coined surfaces around the boss, to impart a final accurate shape and to cold-coin the margin.

5. The method as set forth in claim 3, which further comprises, providing the first set of dies with shapes for forming the boss with a first conical depression on the male die side, and a conical surface on the female die side opposite said first conical depression, together with a reverse conical depression on the female die side within the diameter of the opposite conical surface.

6. The method as set forth in claim 5, which further comprises, striking the margin having the double conical depression-shaped boss and surrounding flat margin with a second or coining die set which fits all surfaces of the margin except the inner cylindrical surface left by the slug removal, to impart a final accurate shape and cold-coin the margin.

7. The method as set forth in claim 3, which further comprises, forming a plurality of holes and margins with bosses at a single operation by oppositely directed die sets, with one hole margin boss projecting from one face of the blank and another hole margin boss projecting from the other face of the blank.

8. The method as set forth in claim 7, which further comprises, final shaping and cold-working said oppositely directed bosses and their surrounding borders by oppositely directed sets of form-fitting dies which finally accurately shape and cold-coin the boss-flanged margins.

9. Apparatus for forming a hole in a work-hardenable plate blank, such as a steel wheel disk blank, with a coined margin around the hole, which comprises, a first or punch die set including opposed blank holders which engage opposite sides of the blank on a large diameter, a female button die disposed in a guide opening of the blank holder on a first side of the blank, said female die having a small-diameter slug-receiving hole with a cutting edge and an outer flat coining surface therearound, a male punch die in a guide opening in the blank holder on the second side of the blank, said male die having an outer annular coining surface mating with and opposing the female die coining surface, a main punch portion having a cutting edge mating within the cutting edge of the female die, and a pilot punch portion of reduced diameter to first engage the blank and draw it before and during the cutting out of a slug, the mating outer coining surfaces of the male and female dies being arranged and actuated to strike the blank and cold-coin it during the blanking stroke after a slug has been cut out from the blank.

10. Apparatus as set forth in claim 9, further characterized by the fact that said female die is formed with a boss-receiving groove around its cutting edge and that said male die is formed with an inclined shoulder around the base of its main punch portion to force a boss flange from the inner edge of the blank hole margin into the groove of the female die member.

11. Apparatus as set forth in claim 10, further characterized by the fact that the cutting edge of the female die is located below its coining surface.

12. Apparatus as set forth in claim 11, which further includes a second or coining set of dies shaped to fit the boss-flanged margin of the hole formed by the first set of dies to cold-coin and finally accurately shape the margin.

13. Apparatus as set forth in claim 12, further characterized by the fact that said second set of dies includes an anvil die with a groove to receive the boss and an outer flat coining surface, and also includes a mating striker die having a conical shoulder to fit within said boss and an outer flat coining surface.

14. Apparatus as set forth in claim 13, which further includes a plurality of oppositely directed punching die sets and a plurality of oppositely directed coining die sets mounted in groups to form and coin a plurality of holes in a blank simultaneously respectively by the punching and coining die sets.

15. A method for producing a hole in a work hardenable metal blank in which the area adjacent the hole is intentionally work hardened for increasing the strength and hardness thereof, the method comprising the following steps:
(1) securing a substantially flat portion of a metal blank in a holding means in which a work area of the blank is exposed for access thereto,
(2) placing the holding means and blank on the base of a pressure applying means with the blank between a first set of dies having a male die and female die and with the holding means supported on the base,
(3) actuating the pressure applying means for applying pressure to the dies to engage the blank, the male die moving toward and engaging the blank and stressing the metal of the work area above the plastic limit thereof, while so stressed the female die engages the metal and cooperates with the male die for cutting a slug from the blank while the blank is under stress, and continuing the application of pressure to the dies to cold work the metal about the hole by the compression of the blank between the dies, and then deactivating the pressure applying means,
(4) replacing the first die set with a second die set and re-aplying pressure to the work area through the second die set for coining the area about the hole in the blank to its final shape.

16. The method as set forth in claim 15 which further comprises, forming an annular boss about the hole during the cutting of the slug from the blank and the initial pressure application to cold work the area about the hole.

17. The method as set forth in claim 16, which further comprises, permitting the flow of metal into the formed hole during the coining to the final shape by providing a clearance space in the second die for flow of any metal flash into the hole opening.

References Cited

UNITED STATES PATENTS

| | | | |
|---|---|---|---|
| 2,188,477 | 1/1940 | Le Jeune | 29—159.01 |
| 3,166,542 | 1/1964 | Niekamp | 29—163.5 |
| 3,131,972 | 5/1964 | Walton et al. | 29—159.01 |
| 3,222,765 | 12/1965 | Parent et al. | 29—159.1 |

FOREIGN PATENTS 333,056   8/1930   Great Britain.

CHARLES W. LANHAM, *Primary Examiner.*

E. M. COMBS, *Assistant Examiner.*

U.S. Cl X.R.

29—159.01; 72—329, 343, 356, 358, 374, 464